(12) United States Patent  (10) Patent No.: US 8,641,129 B2
Tyan et al.  (45) Date of Patent: Feb. 4, 2014

(54) TWELVE-CORNERED STRENGTHENING MEMBER

(75) Inventors: Tau Tyan, Northville, MI (US);
Leonard Anthony Shaner, New Baltimore, MI (US); Yu-Kan Hu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 12/651,614

(22) Filed: Jan. 4, 2010

(65) Prior Publication Data

US 2010/0102592 A1    Apr. 29, 2010

Related U.S. Application Data

(63) Continuation-in-part of application No. 12/233,808, filed on Sep. 19, 2008, now Pat. No. 8,539,737.

(51) Int. Cl.
*E04C 3/04* (2006.01)
*B60R 19/34* (2006.01)

(52) U.S. Cl.
USPC ........................................ 296/187.03; 52/843

(58) Field of Classification Search
USPC .......... 52/836, 843; 296/187.03, 187.09, 205, 296/203.02; 293/132, 133; 188/377
See application file for complete search history.

(56) References Cited

U.S. PATENT DOCUMENTS

| | | | |
|---|---|---|---|
| 1,951,292 A | 3/1934 | Cahill | |
| 2,340,003 A | 1/1944 | McDermott | |
| 3,092,222 A | 6/1963 | Heinle | |
| 3,412,628 A | 11/1968 | De Gain | |
| 4,018,055 A | 4/1977 | Le Clercq | |
| 5,431,445 A * | 7/1995 | Wheatley | 280/784 |
| 5,480,189 A | 1/1996 | Davies et al. | |
| 5,913,565 A * | 6/1999 | Watanabe | 296/187.03 |
| 6,068,330 A | 5/2000 | Kasuga et al. | |
| 6,179,355 B1 | 1/2001 | Chou et al. | |
| 6,523,576 B2 | 2/2003 | Imaeda et al. | |
| 6,588,830 B1 | 7/2003 | Schmidt et al. | |
| 6,705,653 B2 | 3/2004 | Gotanda et al. | |
| 6,752,451 B2 | 6/2004 | Sakamoto et al. | |
| 6,799,794 B2 * | 10/2004 | Mochidome et al. | 296/187.03 |
| 6,893,065 B2 | 5/2005 | Seksaria et al. | |
| 7,044,515 B2 | 5/2006 | Mooijman et al. | |
| 7,252,314 B2 | 8/2007 | Tamura et al. | |
| 7,264,274 B2 | 9/2007 | Ridgway et al. | |
| 7,303,219 B2 | 12/2007 | Trabant et al. | |
| 7,357,445 B2 | 4/2008 | Gross et al. | |

(Continued)

FOREIGN PATENT DOCUMENTS

JP    08-337183    12/1996

OTHER PUBLICATIONS

Machine translation for JP08-337183.*

(Continued)

*Primary Examiner* — Christine T Cajilig
(74) *Attorney, Agent, or Firm* — O'Brien Jones PLLC; Jason Rogers

(57) ABSTRACT

A strengthening member for an automotive vehicle has a twelve-cornered cross section comprising sides and corners creating internal angles and external angles. The strengthening member also comprises one or more of trigger holes, convolutions, and flanges to stabilize the folding mode and prevent bending in response to an axially-applied crash force.

20 Claims, 14 Drawing Sheets

(56) References Cited

U.S. PATENT DOCUMENTS

| | | | |
|---|---|---|---|
| 7,407,219 B2* | 8/2008 | Glasgow et al. | 296/187.03 |
| 7,445,097 B2 | 11/2008 | Tamura et al. | |
| 2002/0153719 A1 | 10/2002 | Taguchi | |
| 2003/0085592 A1 | 5/2003 | Seksaria et al. | |
| 2005/0028710 A1 | 2/2005 | Carpenter et al. | |
| 2006/0033363 A1 | 2/2006 | Hillekes et al. | |
| 2006/0181072 A1 | 8/2006 | Tamura et al. | |
| 2006/0202493 A1* | 9/2006 | Tamura et al. | 293/133 |
| 2006/0202511 A1* | 9/2006 | Tamura et al. | 296/187.03 |
| 2006/0249342 A1* | 11/2006 | Canot et al. | 188/377 |
| 2008/0012386 A1 | 1/2008 | Kano et al. | |
| 2008/0030031 A1* | 2/2008 | Nilsson | 293/133 |
| 2008/0036242 A1 | 2/2008 | Glance et al. | |
| 2008/0106107 A1* | 5/2008 | Tan et al. | 293/133 |
| 2008/0185852 A1 | 8/2008 | Suzuki et al. | |
| 2009/0026777 A1* | 1/2009 | Schmid et al. | 293/133 |
| 2009/0085362 A1 | 4/2009 | Terada et al. | |
| 2009/0102234 A1* | 4/2009 | Heatherington et al. | 296/187.03 |
| 2009/0174219 A1 | 7/2009 | Foreman | |
| 2010/0066124 A1* | 3/2010 | Terada et al. | 296/187.09 |
| 2010/0072788 A1 | 3/2010 | Tyan et al. | |
| 2011/0015902 A1 | 1/2011 | Cheng et al. | |
| 2012/0261949 A1 | 10/2012 | Tyan et al. | |

OTHER PUBLICATIONS

Ali Najafi et al., "Mechanics of Axial Plastic Collapse in Multi-Cell, Multi-Corner Crush Tubes," sciencedirect.com, Sep. 1, 2010.

Xiong Zhang et al., "Crushing Analysis of Polygonal Columns and Angle Elements," sciencedirect.com, Jun. 27, 2009.

Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.

Fyllingen et al., "Simulations of a Top-Hat Section Subjected to Axial Crushing Taking Into Account Material and Geometry Variations," sciencedirect.com, Jul. 31, 2008.

Minoru Yamashita et al., "Quasi-Static and Dynamic Axial Crushing of Various Polygonal Tubes," sciencedirect.com, Jun. 2007.

Office Action dated Aug. 17, 2012 from U.S. Appl. No. 13/087,663.

Response to Office Action dated Aug. 17, 2012 from U.S. Appl. No. 13/087,663.

Response to Office Action dated Jul. 31, 2012 from U.S. Appl. No. 12/233,808.

JP08-337183 English Abstract.

Office Action dated Aug. 19, 2011 from U.S. Appl. No. 12/233,808.

Office Action dated Mar. 7, 2012 from U.S. Appl. No. 12/233,808.

Office Action dated Jul. 31, 2012 from U.S. Appl. No. 12/233,808.

Response to Office Action dated Aug. 19, 2011 from U.S. Appl. No. 12/233,808.

Response to Office Action dated Mar. 7, 2012 from U.S. Appl. No. 12/233,808.

Reply to Office Action dated Oct. 31, 2012 from U.S. Appl. No. 12/233,808.

Office Action dated Feb. 27, 2013 from U.S. Appl. No. 12/233,808.

Reply to Office Action dated Apr. 29, 2013 from U.S. Appl. No. 12/233,808.

Office Action dated Jun. 28, 2013 from U.S. Appl. No. 12/891,801.

* cited by examiner

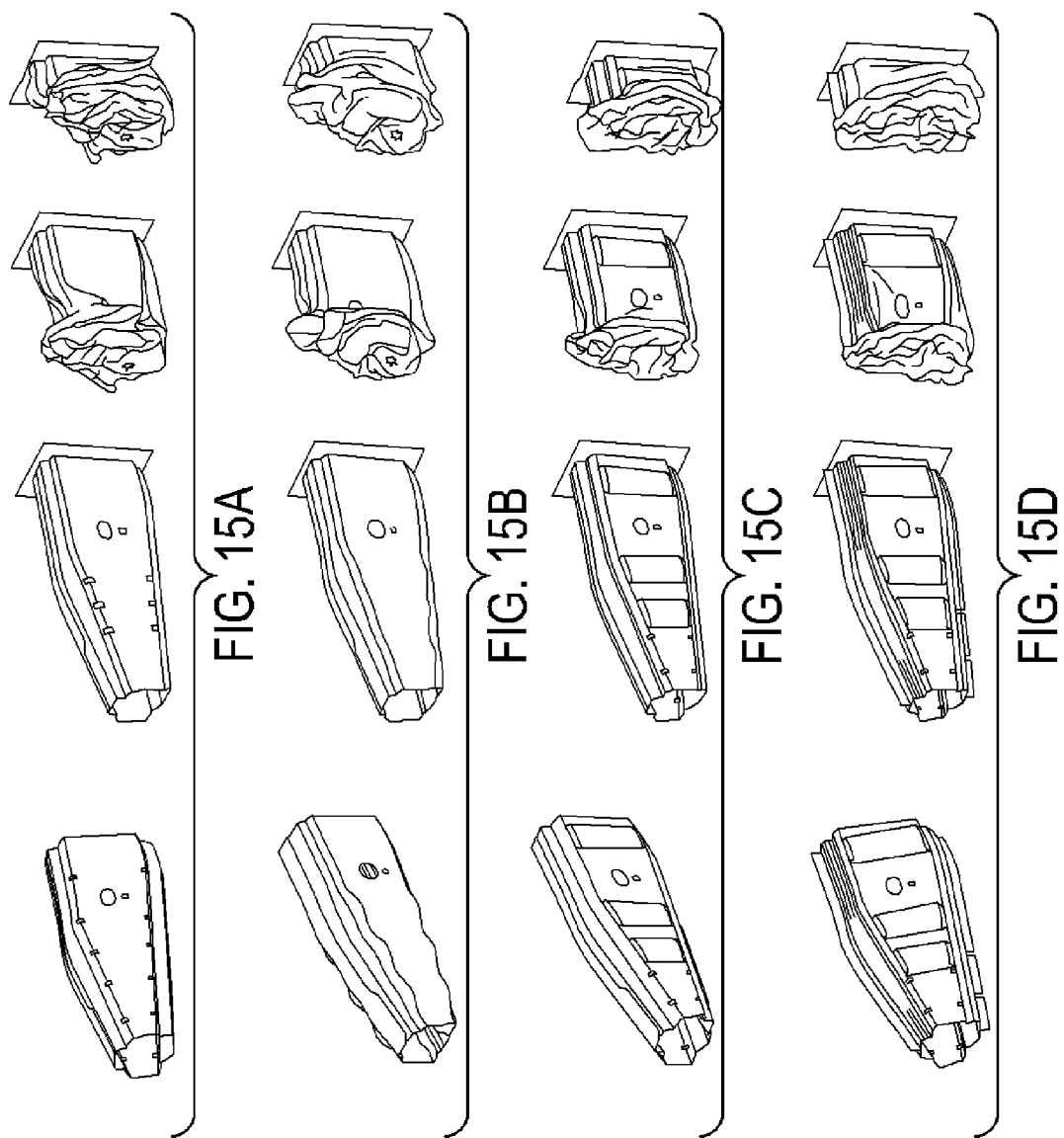

TWELVE-CORNERED STRENGTHENING MEMBER

This application is a continuation-in-part of U.S. patent application Ser. No. 12/233,808, filed Sep. 19, 2008 now U.S. Pat. No. 8,539,737, the entire content of which is incorporated herein by reference.

INTRODUCTION

The present teachings relate generally to a strengthening member for a vehicle body or other structures. The present teachings relate more specifically to a strengthening member having a twelve-cornered cross section.

BACKGROUND

It is desirable, for vehicle strengthening members, to maximize impact energy absorption and bending resistance while minimizing mass per unit length of the strengthening member.

When a compressive force is exerted longitudinally on a strengthening member, for example a force due to a front impact load on a vehicle's front rail or other strengthening member in the engine compartment, the strengthening member can crush in a longitudinal direction to absorb the energy of the collision. In addition, when a bending force is exerted on a strengthening member, for example a force due to a side impact load on a vehicle's front side sill, B-pillar or other strengthening member, the strengthening member can bend to absorb the energy of the collision.

U.S. Pat. No. 6,752,451 discloses a strengthening member having concave portions at the four corners of a basic rectangular cross section, resulting in four U-shaped portions forming an angle of 90 degrees with each other. To avoid cracks at the concave portions at the four corners and to increase strength, the concave portions have increased thickness and hardness. Increased thickness and hardness of the corner portions is disclosed to be achievable only by drawing or hydroforming, and therefore decreases manufacturing feasibility while increasing the mass per unit length of the strengthening member.

U.S. Pat. No. 6,752,451 makes reference to Japanese Unexamined Patent Publication No. H8-337183, which also discloses a strengthening member having concave portions at the four corners of a basic rectangular cross section, resulting in four U-shaped portions forming an angle of 90 degrees with each other. U.S. Pat. No. 6,752,451 states that its thickened concave portions provide improved crush resistance and flexural strength over H8-337183.

It may be desirable to provide a strengthening member configured to achieve the same or similar strength increase as provided by the thickened corners, while minimizing mass per unit length of the member and maintaining a high manufacturing feasibility.

It may further be desirable to provide a strengthening member that can achieve increased energy absorption and a more stable axial collapse when forces such as front and side impact forces are exerted on the strengthening member. Additionally, it may be desirable to provide a strengthening member that possesses improved noise-vibration-harshness performance due to work hardening on its corners.

Under certain conditions, axial collapse of a strengthening member can proceed in an unstable buckling mode that is initiated in a middle of the strengthening member before moving to a top of the strengthening member in a non-progressive manner. During quasi-static crash testing, an unstable collapse mode can occur because deformation occurs so slowly that it leaves enough time for the test to react to imperfections in the strengthening member. An unstable collapse mode increases the variation in crash behaviors among replicate samples and makes crash performance more difficult to predict.

It is desirable for longitudinal rails to collapse axially and progressively in a predetermined mode during a crash such as a rear or frontal impact. While a stable axially progressive folding mode is generally considered to be the most effective mechanism for energy absorption, it can be difficult to achieve in structures having thin-walled sections.

SUMMARY

In accordance with certain embodiments, the present teachings provide a strengthening member for an automotive vehicle. The strengthening member has a twelve-cornered cross section comprising sides and corners creating internal angles and external angles. The strengthening member also comprising one or more of trigger holes, convolutions, and flanges to stabilize the folding mode and prevent bending in response to an axially-applied crash force. The increased strength of the twelve-cornered strengthening member allows the use of structural features such as trigger holes, convolutions, and flanges without concern for any change in overall member strength that the structural features may cause, creating an unpredictably a strong and stable strengthening member with balanced stiffness and stable crush.

Certain embodiments of the present teachings also provide a method for manufacturing a strengthening member having increased axial compression strength and stability without increased weight. The method comprises forming a strengthening member, pressing the strengthening member so that it has a twelve-cornered cross section, and forming, drilling, or punching trigger holes to stabilize the folding mode of the strengthening member upon axial compression.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain certain principles of the teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 15 illustrates how various crash trigger holes and other stabilizers can be utilized to stabilize a crash mode of a twelve-cornered strengthening member.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a strengthening member with a twelve-cornered cross section having a substantially increased stiffness throughout the sides and corners without increasing thickness within the corners. The strengthening member can achieve increased energy absorption and a more stable axial collapse when forces such as front and side impact forces are exerted on the strengthening member. The strengthening member can also possess improved durability and noise-vibration-harshness (NVH) performance due to work hardening on the twelve corners. The degrees of the internal and external angles of the present teachings can achieve the same strength increase as thickened corners, while minimizing mass per unit length of the member and maintaining a high manufacturing feasibility because the member can be formed by bending, rolling, stamping, pressing, hydro-forming, molding, extrusion, cutting, and forging.

Figure 1:
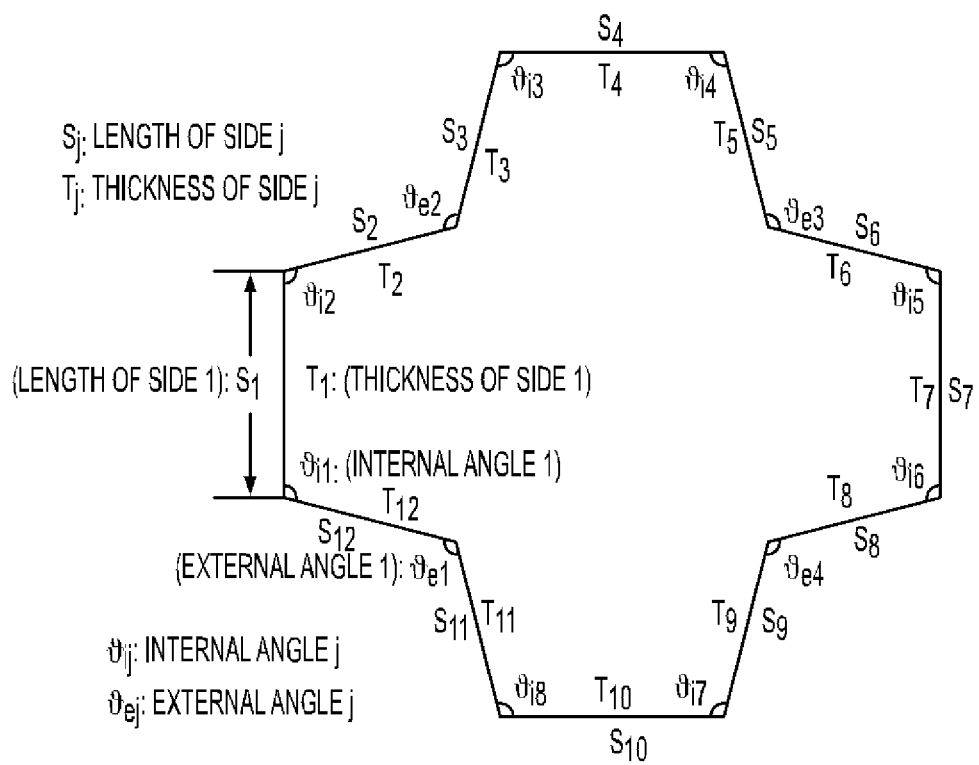
FIG. 1 is a cross sectional view of an exemplary embodiment of a twelve-cornered cross section for a strengthening member in accordance with the present teachings.

An exemplary embodiment of a twelve-cornered cross section for a strengthening member in accordance with the present teachings is illustrated in FIG. 1. As illustrated, the cross section comprises twelve sides having lengths $S_1$-$S_{12}$ and thicknesses $T_1$-$T_{12}$, eight internal corners with angles $\theta_{i1}$-$\theta_{i8}$ and four external corners with angles $\theta_{e1}\theta_{e4}$. The internal and external angular degrees can be varied to achieve improved strength and other performance features (e.g., stability of folding pattern) compared to existing 90°-angled cross sections. This improved strength can obviate the need for increased corner thickness, which is an unexpected and unpredictable benefit of fine-tuning the internal and external angular degrees of a strengthening member having a twelve-cornered cross section. In accordance with various embodiments of the present teachings, each internal angle can range from about 100° to about 110°, and each external angle can range from about 105° to about 130°. The lengths $S_1$-$S_{12}$ and thicknesses $T_1$-$T_{12}$ of the sides can be varied to a certain degree, as would be understood by one skilled in the art, for example in accordance with available packaging space within a vehicle.

In certain embodiments of the present teachings, a thickness of the sides and corners can range from about 0.7 mm to about 6.0 mm. In certain embodiments, the thickness of the sides is substantially the same as the thickness of the corners.

Conventional strengthening members having square or rectangular cross sections are widely used due to their high manufacturing feasibility. Because a strengthening member with a twelve-cornered cross section in accordance with the present teachings has substantially increased strength and stiffness without requiring thicker corner portions, it has a higher manufacturing feasibility than previously-contemplated twelve-cornered members that have thickened 90° corners. While still providing a desired strength, a strengthening member in accordance with the present teachings can be formed in one or multiple sections by, for example, bending, rolling, stamping, pressing, drawing, hydro-forming, molding, extrusion, cutting, and forging. Thus-formed sections can be joined via welding, adhesive, fastening, or other known joining technologies.

In accordance with certain exemplary embodiments of the present teachings, the thickness of the strengthening member may vary, for example, within one side or from side to side to optimize the overall axial crush and bending performance. Examples of such varied thickness embodiments are illustrated in FIGS. 5D and 6D, which are described in detail below.

Figure 2:
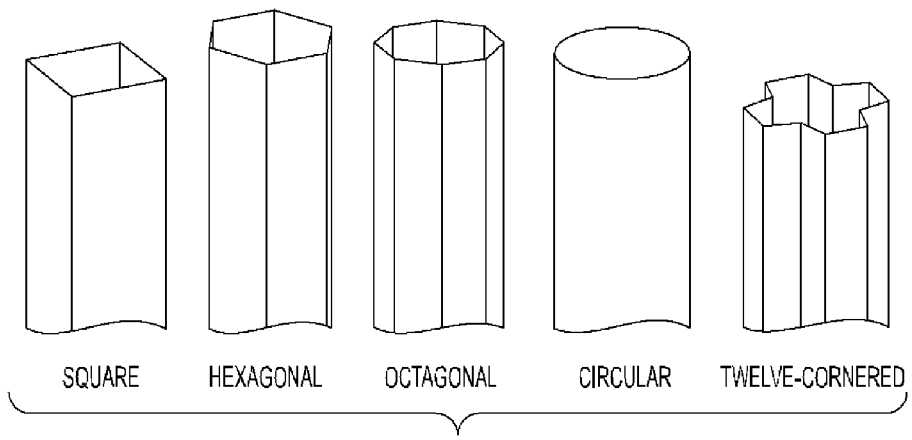
FIG. 2 illustrates perspective sectional views of strengthening members of varying cross sections having a substantially constant thickness and perimeter.
Figure 3:
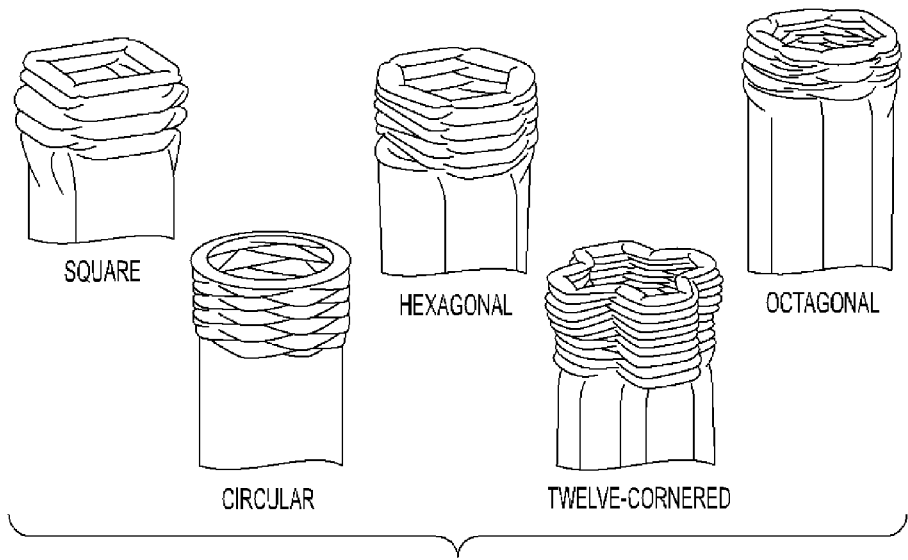
FIG. 3 illustrates perspective sectional views of the exemplary axial collapse of the strengthening members shown in FIG. 2.

In comparing crash energy absorption of strengthening members of varying shapes having the same thickness and perimeter, as illustrated in FIG. 2, for example for an impact with a rigid wall at 35 mph, a twelve-cornered cross section in accordance with the present teachings demonstrated the shortest crush distance and smallest folding length. The twelve-cornered cross section in accordance with the present teachings also demonstrated the most stable axial collapse and the highest crash energy absorption. In fact, a twelve-cornered cross section in accordance with the present teachings can achieve about a 100% increase in crash energy absorption over a square cross section and a 20-30% increase in crash energy absorption over hexagonal and octagonal cross sections. FIG. 3 illustrates an exemplary axial collapse of the strengthening members shown in FIG. 2. As can be seen, the strengthening member having a twelve-cornered cross section in accordance with the present teachings exhibits the shortest crush distance and most stable folding pattern.

Figure 4:
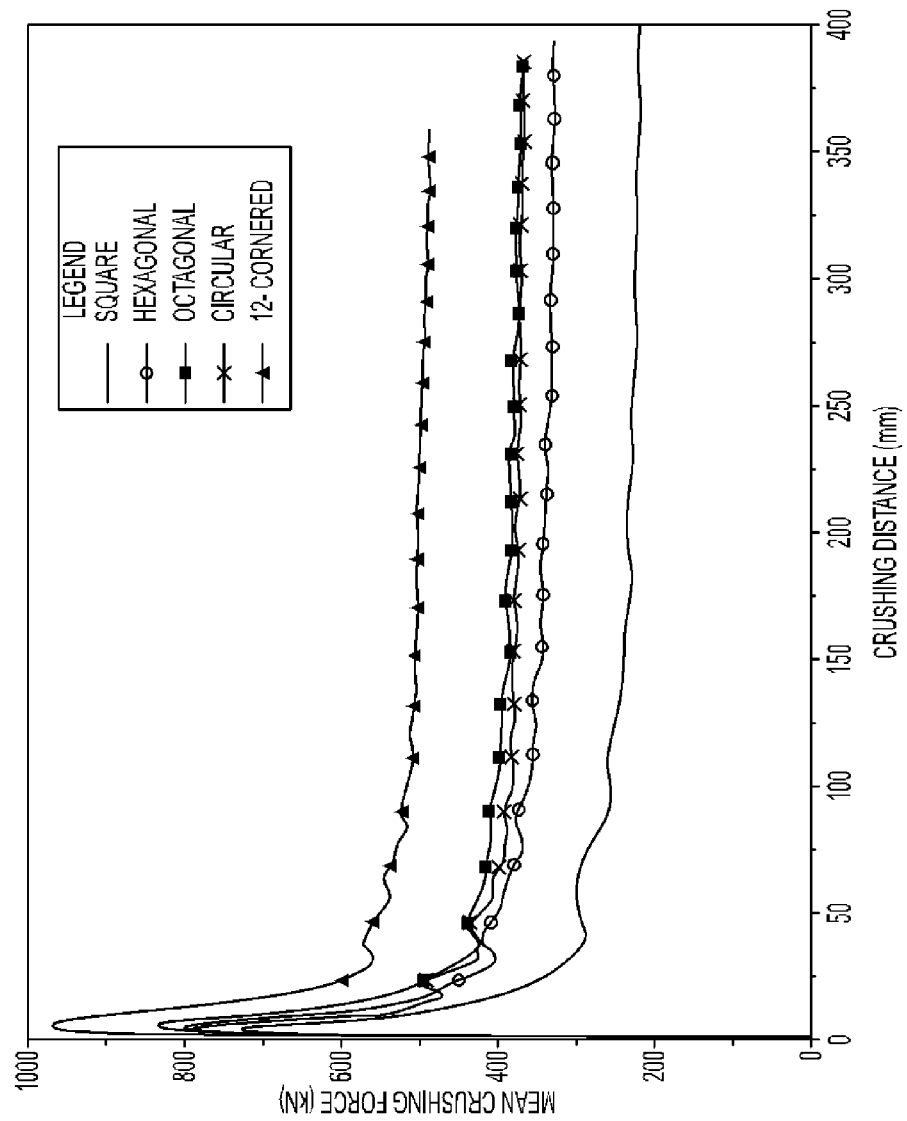
FIG. 4 is a graph of the mean crush force and associated axial crush distance for exemplary strengthening members having cross sections shown in FIG. 2.

FIG. 4 illustrates a graph of mean crush force for an impact with a rigid wall at 35 mph, in kN, exerted axially on exemplary strengthening members having the cross sections shown in FIG. 2. As can be seen, a strengthening member having a twelve-cornered cross section in accordance with the present teachings can sustain a much higher crushing force for a given resulting crushing distance. This allows improved impact energy management while minimizing mass per unit length.

A twelve-cornered cross section in accordance with the present teachings is contemplated for use with a number of structural members such as a front rail, a side rail, a cross member, roof structures, and other components that can benefit from increased crash energy absorption. In addition, the present teachings can be applied to both body-on-frame and unitized vehicles, or other types of structures.

Figure 5B:
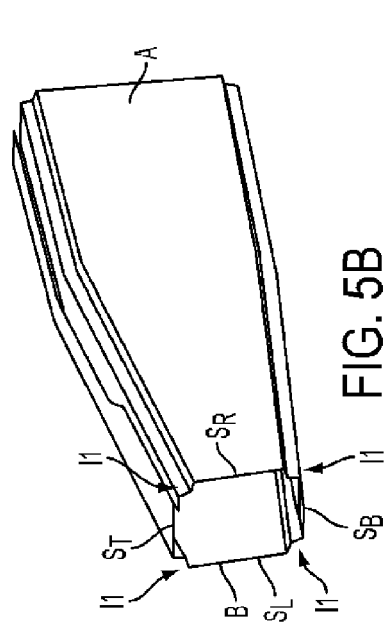
FIGS. 5A-5D illustrate perspective views vehicle front rails without convolutions, having varying cross sections including twelve-cornered cross sections in accordance with the present teachings.
Figure 5D:
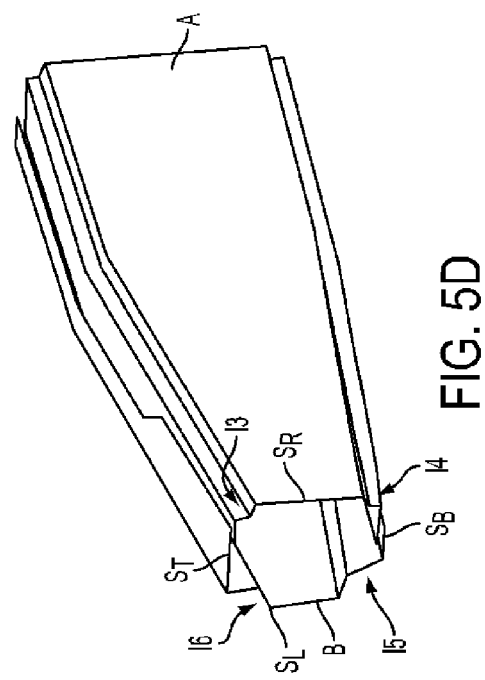
Figure 5A:
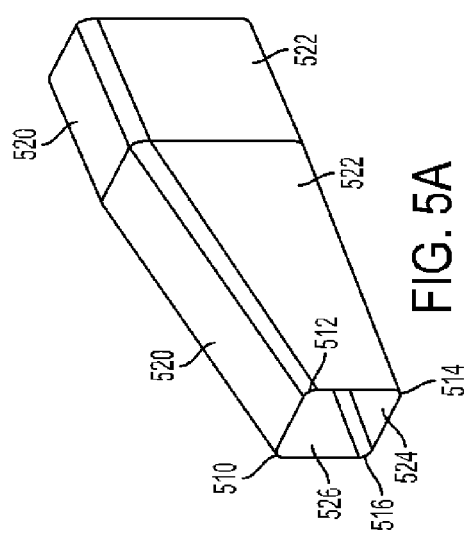
Figure 5C:
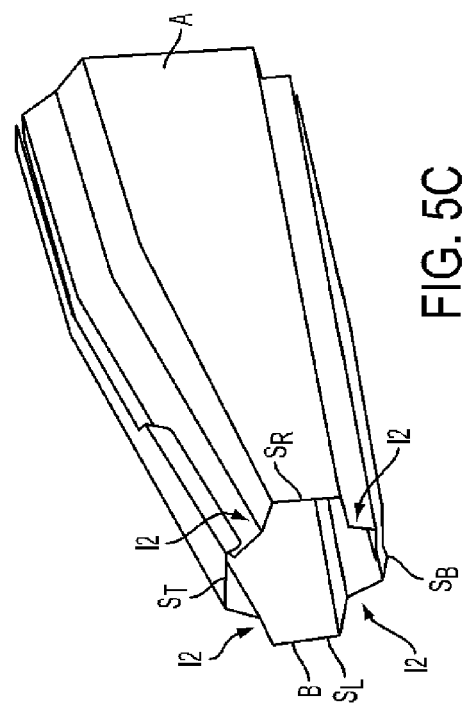

FIGS. 5A-5D illustrate exemplary embodiments of a vehicle front rail having a cross section in accordance with the present teachings. The front rail is of a type without convolutions. FIG. 5A illustrates a front rail having a known, substantially rectangular cross section with four corners 510, 512, 514, 516 of about ninety degrees, and four sides 520, 522, 524, 526. FIGS. 5B through 5D illustrate front rails having twelve-cornered cross sections in accordance with the present teachings, the corner indentations I2 in FIG. 5C being greater than the indentations I1 in FIG. 5B. In these illustrated exemplary embodiments, the rails have a two-part construction comprising pieces A and B. The present teachings contemplate rails of other construction such as one-piece or even 3-or-more piece construction, the number of pieces in FIGS. 5A through 5D being exemplary only.

The embodiments of FIGS. 5B and 5C include top and bottom sides, $S_T$ and $S_B$ respectively, having substantially the same length as each other, and left and right sides, $S_L$ and $S_R$ respectively, also having substantially the same length as each other. Piece A includes right side $S_R$ and part of bottom side $S_B$ and top side $S_T$. Piece B includes left side $S_L$ and part of bottom side $S_B$ and top side $S_T$. To simplify FIGS. 5B-5D, all of the sides $S_1$ through $S_{10}$ illustrated in FIG. 1 are not labeled but are of course present. Similarly, the eight internal corners (angles: $\theta_{i1}$-$\theta_{i8}$) and four external corners (angles: $\theta_{e1}$-$\theta_{e4}$) illustrated in FIG. 1 are not labeled but are present.

FIG. 5D illustrates a front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 5D, corner indentations I3 and I4 have the different depths, corner indentation I4 being shallower than corner indentation I3. Corner indentations I5 and I6 have substantially the same depth as each other, that depth differing from the depths of corner indentations I3 and I4. The top and bottom sides, $S_T$ and $S_B$ respectively, have different lengths, with top side $S_T$ being longer than bottom side $S_B$, and the left and right sides, $S_L$ and $S_R$ respectively, have differing lengths, with right side $S_R$ being longer than left side $S_L$. The internal and external angles θ (not labeled) may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles θ.

For a front rail comprising SAE1010 material, a front rail as illustrated in FIG. 5B (with shallower indentations) can save, for example, about 17% weight compared to a square or rectangular cross section, and a front rail as illustrated in FIG. 5C (with deeper indentations) can save, for example, about 35% weight. For a front rail comprising DP600 material, a front rail as illustrated in FIG. 5B (with shallower indentations) can save, for example, about 23% weight and a front rail as illustrated in FIG. 5C (with deeper indentations) can save, for example, about 47% weight. Such weight savings are realized because the increased strength of the twelve-cornered cross section allows the use of a thinner gauge material to provide the same strength.

Figure 6B:
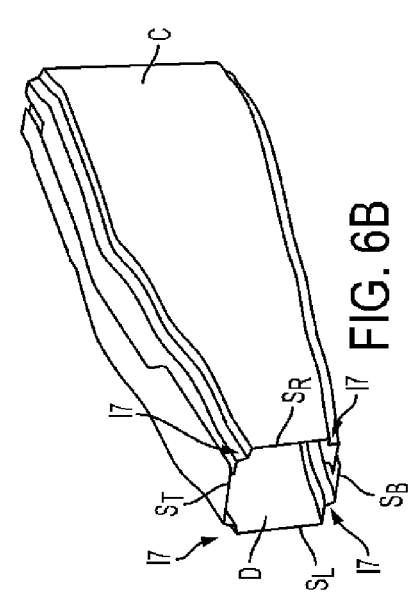
FIGS. 6A-6D illustrate perspective views of vehicle front rails with convolutions, having varying cross sections including twelve-cornered cross sections in accordance with the present teachings.
Figure 6D:
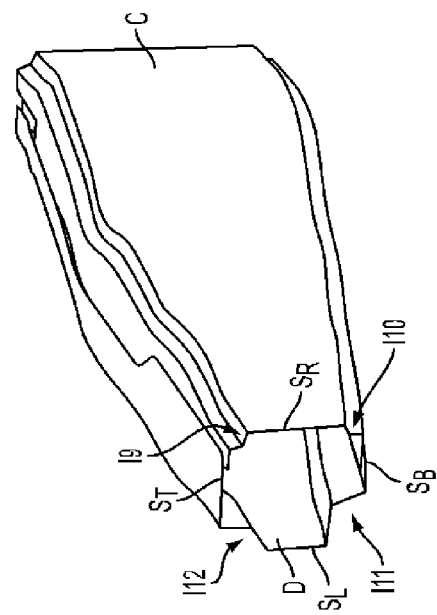
Figure 6A:
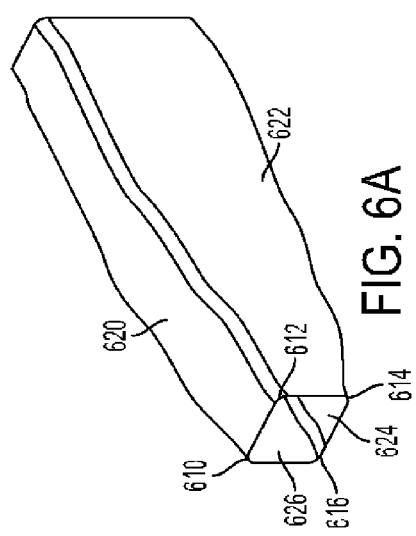
Figure 6C:
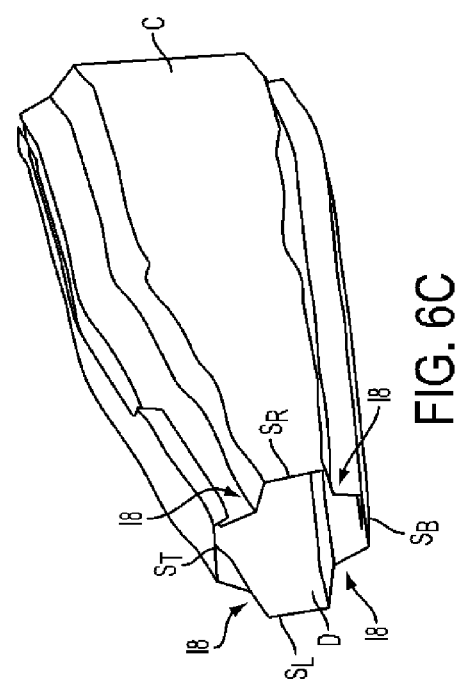

FIGS. 6A-6D illustrate exemplary embodiments of a vehicle front rail having a cross section in accordance with the present teachings. The front rail is of a type with convolutions. FIG. 6A illustrates a convoluted front rail having a known, substantially rectangular cross section with four corners 610, 612, 614, 616 of about ninety degrees, and four sides 620, 622, 624, and 626. FIGS. 6B through 6D illustrate convoluted front rails having twelve-cornered cross sections in accordance with the present teachings, the corner indentations I8 in FIG. 6C being greater than the indentations I7 in FIG. 6B. In these illustrated exemplary embodiments, the rails have a two-part construction with pieces C and D. As stated above, the two-piece constructions shown in FIGS. 6B through 6D are exemplary only and the present teachings contemplate rails of other construction such as one-piece or even 3-or-more piece construction.

The embodiments of FIGS. 6B and 6C include top and bottom sides, $S_T$ and $S_B$ respectively, having substantially the same length as each other, and left and right sides, $S_L$ and $S_R$ respectively, also having substantially the same length as each other. Piece C includes right side $S_R$ and part of bottom side $S_B$ and top side $S_T$. Piece D includes left side $S_L$ and part of bottom side $S_B$ and top side $S_T$. To simplify FIGS. 6B-6D, all of the sides $S_1$ through $S_{10}$, as illustrated in FIG. 1, are not labeled but are present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 6D illustrates a convoluted front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 6D, corner indentations I9 and I10 have the different depths, with corner indentation I10 being shallower than corner indentation I9. Corner indentations I11 and I12 have substantially the same depth as each other, that depth differing from the depths of corner indentations I9 and I10. The top and bottom sides, $S_T$ and $S_B$ respectively, have different lengths, with top side $S_T$ being longer than bottom side $S_B$, and the left and right sides, $S_L$ and $S_R$ respectively, have differing lengths, with right side $S_R$ being longer than left side $S_L$. The internal and external angles θ (not labeled) may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles θ.

For a convoluted front rail comprising SAE1010 material, a front rail as illustrated in FIG. 6B (with shallower indentations) can save, for example, about 20% weight compared to a square or rectangular cross section, and a front rail as illustrated in FIG. 6C (with deeper indentations) can save, for example, about 32% weight. For a convoluted front rail comprising DP600 material, a front rail as illustrated in FIG. 6B (with shallower indentations) can save, for example, about 30% weight and a front rail as illustrated in FIG. 6C (with deeper indentations) can save, for example, about 41% weight.

Figure 7:
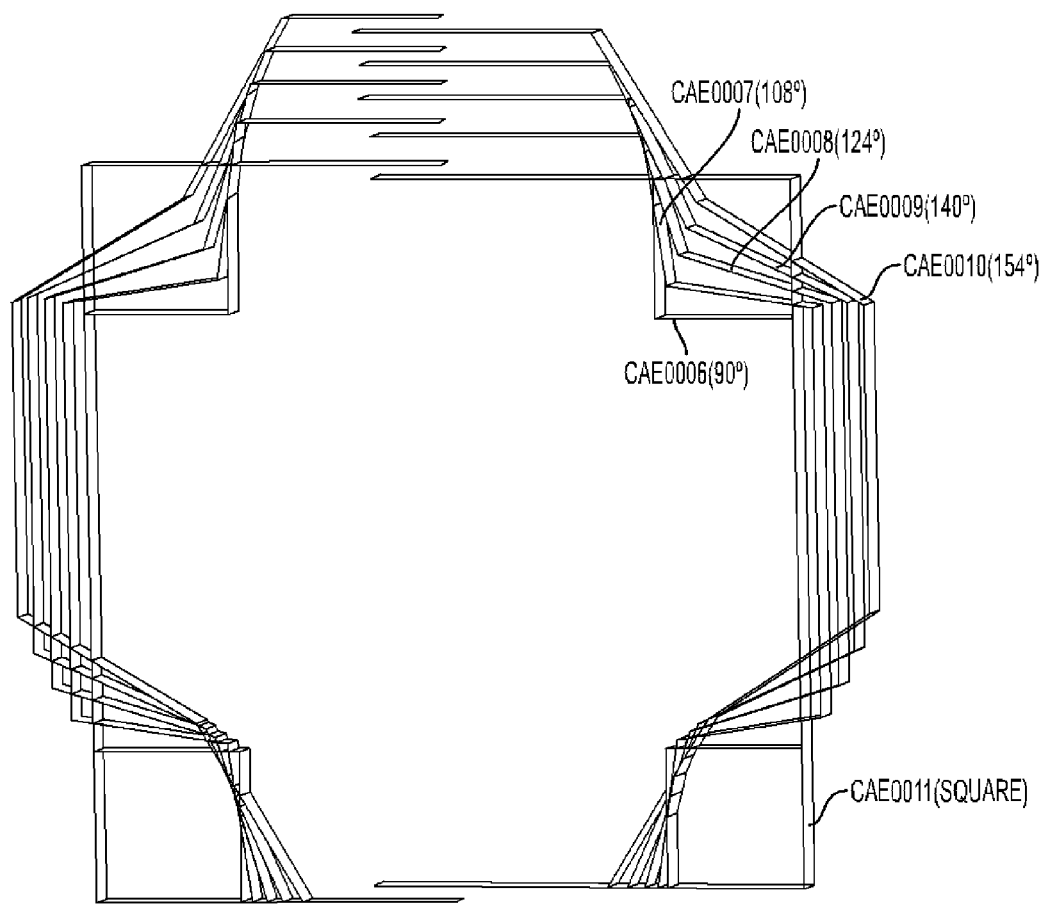
FIG. 7 illustrates comparative cross sectional geometries of twelve-cornered strengthening members having varying shapes and a four-cornered strengthening member having the same thickness and perimeter.
Figure 8:
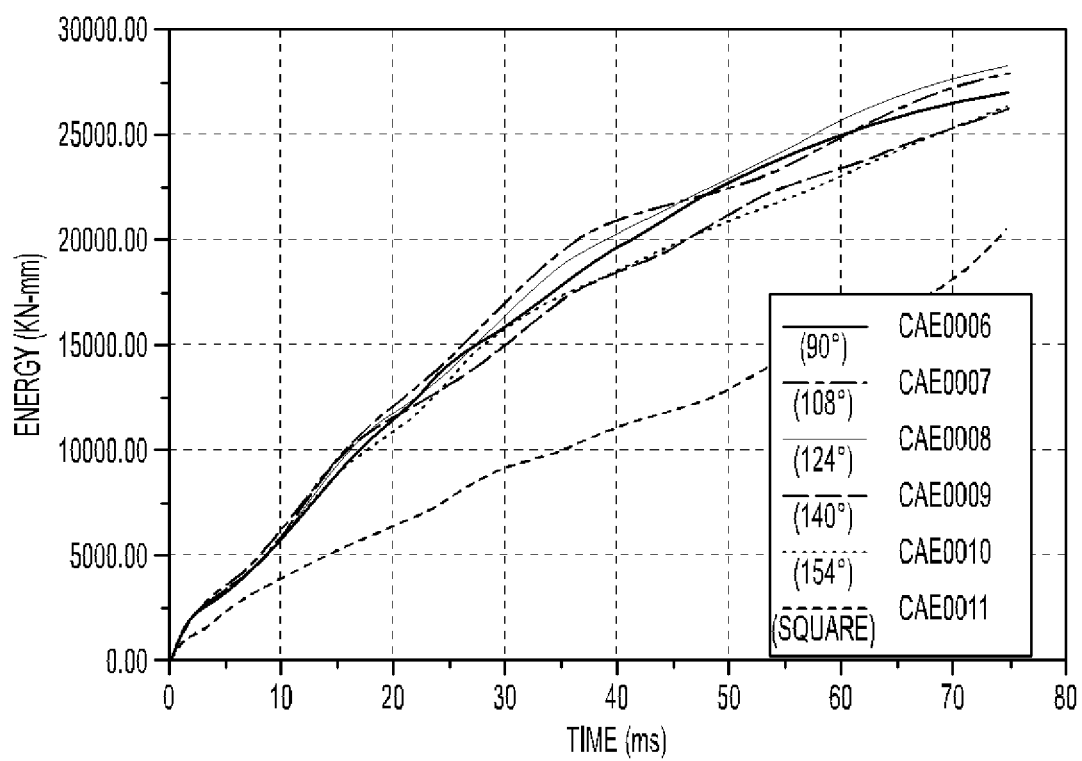
FIG. 8 is a graph showing the comparison of the crash energy absorbed (for a given force) by strengthening members having the exemplary cross sections illustrated in FIG. 7.

Strengthening members having a variety of cross sections are illustrated in FIG. 7. As can be seen, CAE006 has a twelve-cornered cross section with external angles of 90°. CAE007 has a twelve-cornered cross section with external angles of 108° in accordance with the present teachings. CAE008 has a twelve-cornered cross section with external angles of 124° in accordance with the present teachings. CAE009 has a twelve-cornered cross section with external angles of 140°. CAE010 has a twelve-cornered cross section with external angles of 154°. Finally, CAE011 has a square cross section. A comparison of the axial crush strength of the illustrated square and twelve-cornered cross sections having differing external angles is illustrated in FIG. 8. As can be seen, the overall axial crush strength of the strengthening member having a twelve-cornered cross section is far greater than that of the strengthening member having a square cross section.

As can further be seen, the exemplary strengthening members with twelve-cornered cross sections having external angles of 108° and 124° show an overall increase in axial crush strength over twelve-cornered cross sections having external angles of 90°. In fact, deviation of the angles from 90° such that each internal angle is about the same as other internal angles and ranges from about 100° to about 110°, and each external angle is about the same as other external angles and ranges from about 105° to about 130°, increases strength without negatively affecting the stability of a crush mode of the strengthening member. Such an increase in strength obviates the need for reinforcing (e.g., thickening) the concave portions at the four corners of the strengthening member, decreasing weight and cost and increasing manufacturing feasibility.

Strengthening members in accordance with the present teachings can comprise, for example, steel, aluminum, magnesium, fiberglass, nylon, plastic, a composite, or any other suitable materials. Exemplary implementations of the strengthening member can comprise, for example, a high strength steel such as, for example, DP590, DP590R, or HSLA350. These three steels have similar yield strengths, but DP590 and DP590R have a higher tensile strength than HSLA350. DP590R has a ferrite-bainite microstructure and a slightly higher yield-to-tensile strength ratio than DP590.

Figure 9:
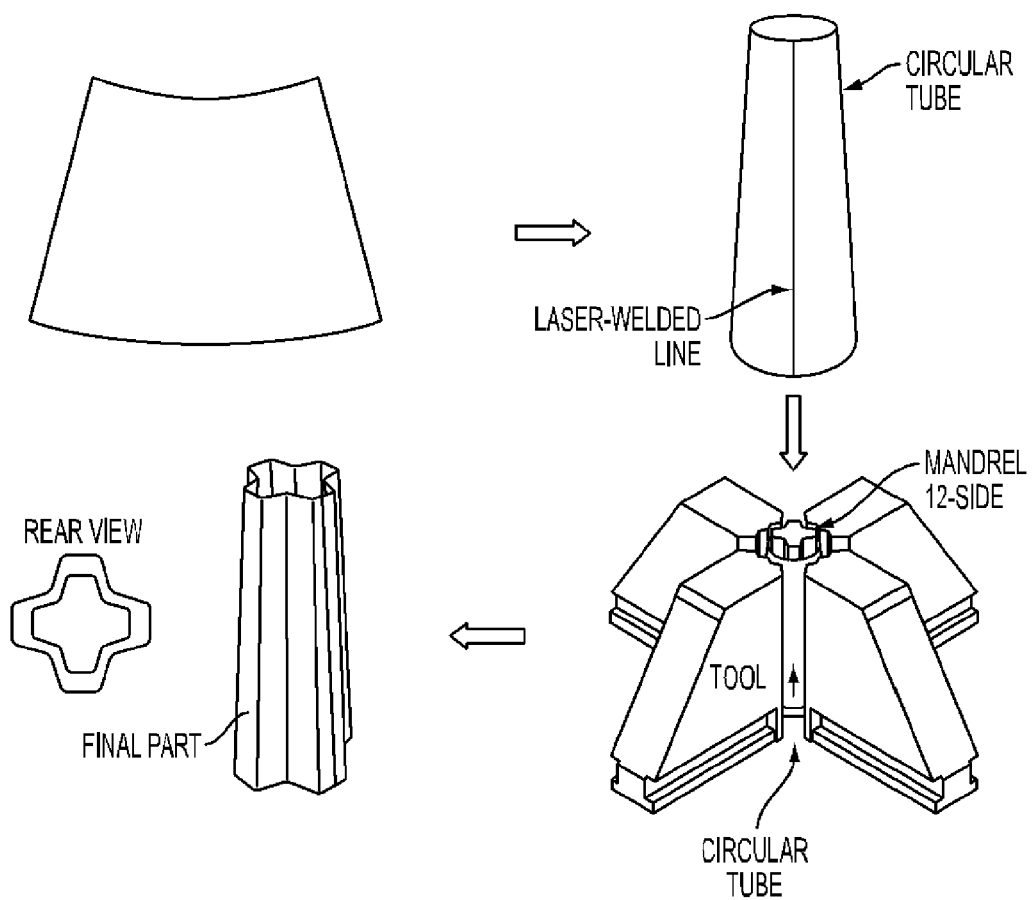
FIG. 9 illustrates an exemplary method for manufacturing a twelve-cornered crossmember in accordance with the present teachings.

FIG. 9 illustrates an exemplary method for forming a twelve-cornered crossmember in accordance with the present teachings. As shown, a press-forming process can be used to fabricate the crossmember. In the upper left corner of FIG. 9, the process can start with a developed blank having a desired dimension for an intended application. Looking to the upper right side of FIG. 9, the blank can be laser welded into a conical tube. In the lower right corner of FIG. 9, the conical tube is placed around a mandrel having a desired shape for the twelve-cornered crossmember and four external tools are moved simultaneously inwardly to press the conical tube toward the mandrel so that the tube takes the shape of the mandrel. Thereafter, the twelve-cornered crossmember can be trimmed at one or both ends to meet the desired dimensions.

Figure 10:
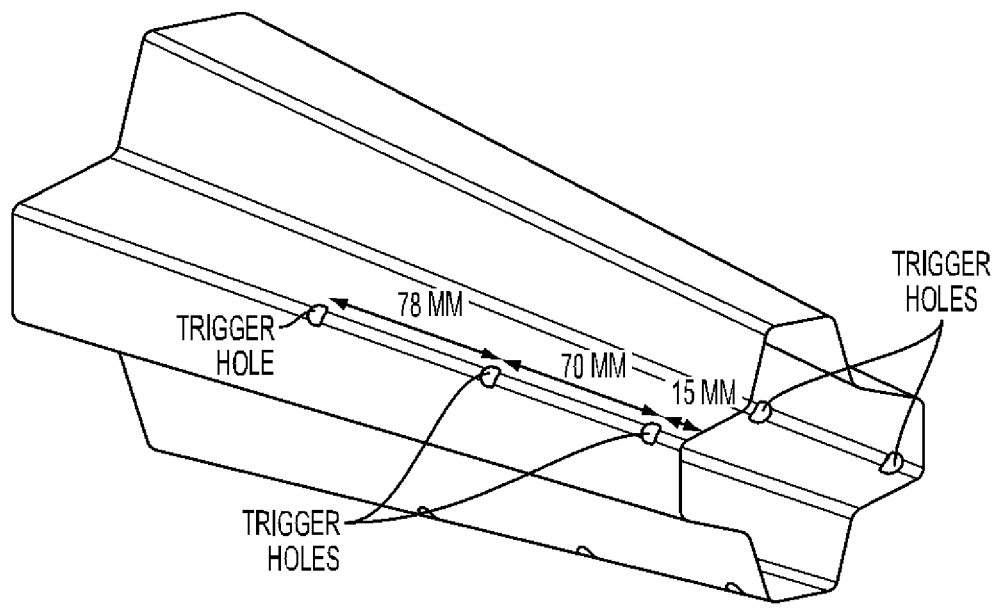
FIG. 10 is a perspective view of an exemplary embodiment of a strengthening member comprising crash trigger holes.
Figure 11:
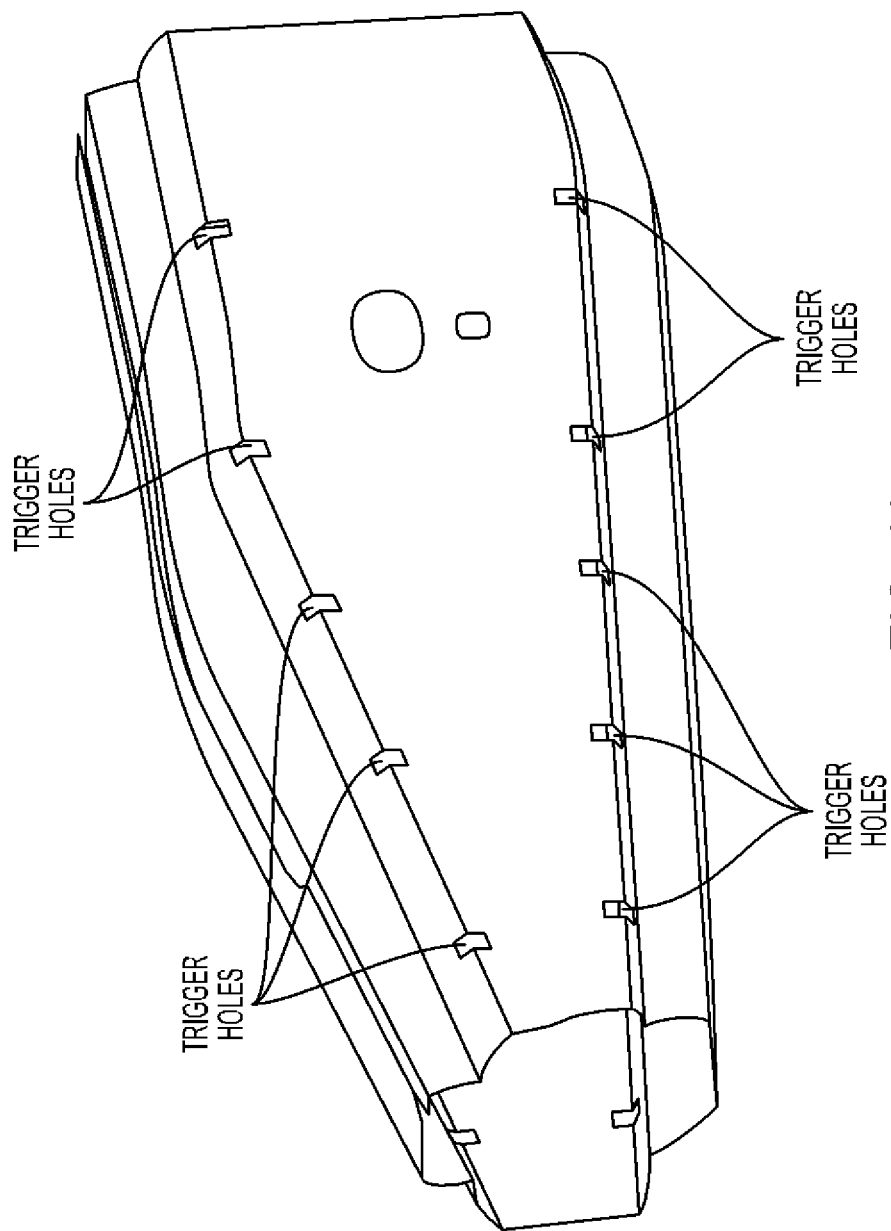
FIG. 11 is a perspective view of another exemplary embodiment of a strengthening member comprising crash trigger holes.
Figure 12:
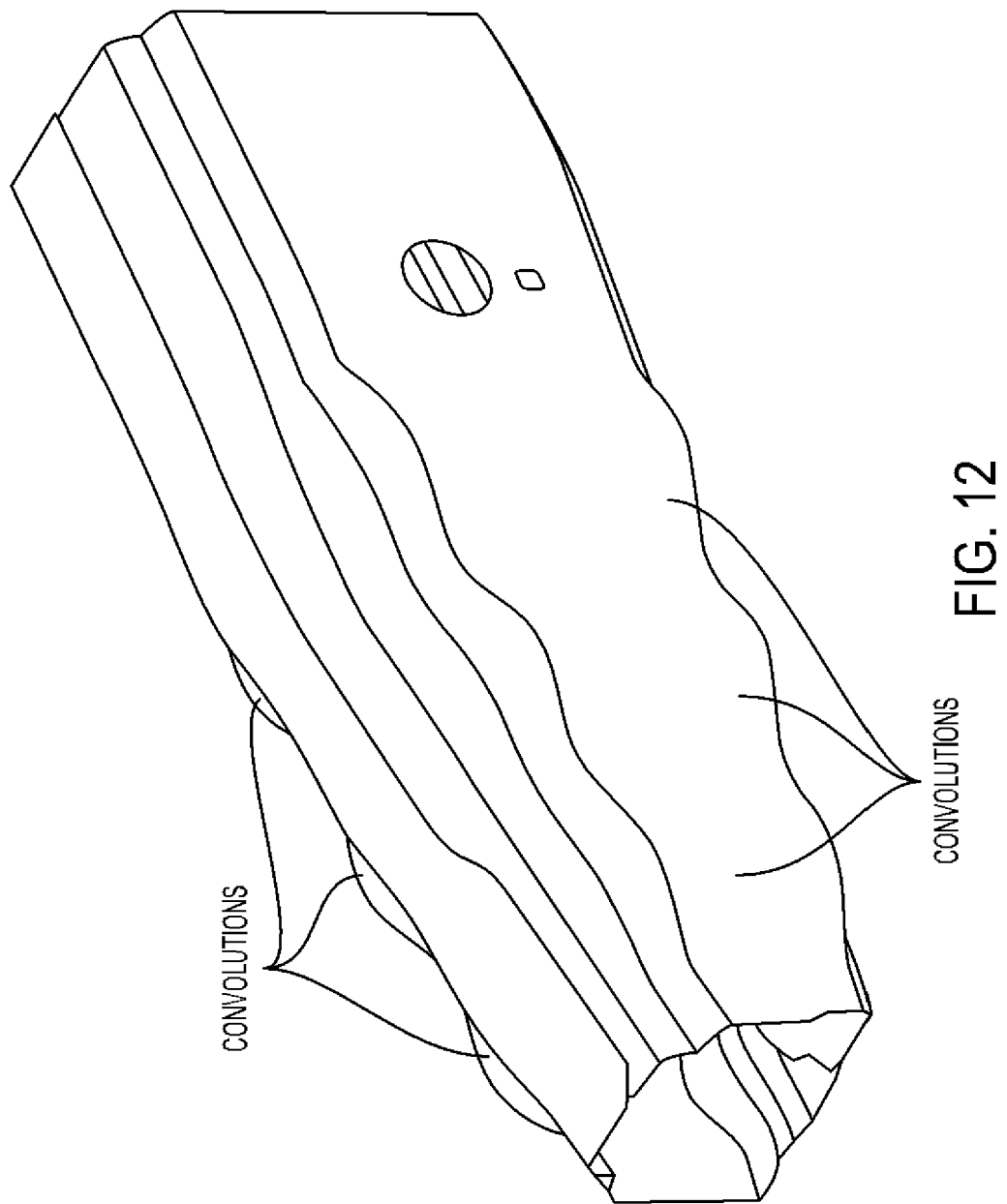
FIG. 12 is a perspective view of another exemplary embodiment of a strengthening member comprising convolutions.

In accordance with certain embodiments, crash trigger holes can be added to a strengthening member to stabilize crash behavior (e.g, the collapse mode of the strengthening member). Crash trigger holes can allow improved control of the crash deformation process, resulting in more stable and regular folding modes. An exemplary embodiment of a strengthening member comprising crash trigger holes is illustrated in FIG. 10. As shown, three rings of circular trigger holes are employed, each trigger hole having, for example, a diameter of about 2 mm to about 20 mm. The holes can be, for example, mechanically drilled, punched or otherwise formed on every other convex corner of the twelve-cornered strengthening member. Thus, each of the three rings would include four trigger holes. The distance from the front end of the strengthening member to the first hole can be about 10 mm to about 20 mm. The embodiment illustrated in FIG. 10 shows a distance of about 15 mm. The distance from the first hole to the second hole can be about 60 to 80 mm. The embodiment illustrated in FIG. 10 shows a distance of about 70 mm. The distance from the second hole to the third hole can be about 70 to 90 mm. The embodiment illustrated in FIG. 10 shows a distance of about 78 mm. One skilled in the art will appreciate that the spacing, size, and placement of the trigger holes can vary depending on, for example, the size of the strengthening member and the desired collapse characteristics. Further, the size and spacing of the trigger holes need not be the same and need not be symmetric. Indeed, more or larger trigger holes may be employed toward a front, a rear, or a particular side of the strengthening member, particularly if the strengthening member is asymmetric.

Trigger holes can work the following manner. Each strengthening member has a natural folding and bending pattern depending on its cross section and overall geometry. Trigger holes can act to weaken a strengthening member and cause folding upon axial compression to occur at the locations of the trigger holes. Trigger holes can be used to balance the stiffness of a strengthening member. For example, a strengthening member can bend upward when the upper surfaces are weaker than the lower surfaces. In such a case, adding trigger holes to a lower surface of the strengthening member can lessen the stiffness of the lower surface to match the stiffness of the upper surface. When the stiffness of the upper and lower surfaces is equal, the member will crush axially instead of bending upward when a compressive force is exerted on the member longitudinally.

Trigger holes can also make it easier for a strengthening member to fold progressively. When a strengthening member folds progressively, it can be less prone to bend sideways. Placement and design of the trigger holes on a strengthening member, including the size, shape (e.g., rectangular, circular, square, and diamond), location, and spacing, can control a member's folding pattern and crush mode.

Utilizing trigger holes to stabilize collapse of the strengthening member can decrease the overall yield strength of the strengthening member, as would be understood by one skilled in the art. The present teachings contemplate employing bake hardening to increase the yield strength of the strengthening member, particularly when trigger holes are utilized to stabilize collapse characteristics of the strengthening member. In accordance with various embodiments, bake hardening can comprise a paint baking thermal cycle as is known to those skilled in the art. An exemplary paint baking thermal cycle for a strengthening member comprising advanced high strength steel (AHSS) can include baking a strengthening member at about 170° C. for about thirty-five minutes. Different baking temperatures and times can be employed in accordance with the present teachings depending, for example, on the composition and size of the strengthening member, and on the desired increase in yield strength. The increased yield strength achieved by baked hardening the strengthening member can be used to offset any decrease in yield strength that may be caused by introduction of triggers holes to stabilize collapse characteristics of the strengthening member.

In certain embodiments, the thickness of the strengthening member may vary within one side or from side to side to optimize the overall axial crush and bending performance, as illustrated in FIGS. 5D and 6D. Further, due to packaging, styling, and other constraints, strengthening members can be inclined and asymmetric in certain vehicle environments, as illustrated in FIGS. 11, 12, 13A, 13B, 14A, and 14B. Certain vehicle environments can make it difficult for the strengthening member to be designed in a symmetrical manner, which can lessen the stability of the strengthening member's folding mode during an axial collapse. If a stable folding mode is not achieved and bending occurs from an axially-applied crash force, the strengthening member can crush in a manner that lessens its ability to absorb energy. Crash trigger holes (see FIGS. 10 and 11) and other types of stabilizers can be employed in accordance with the present teachings to stabilize the folding mode and prevent bending in response to an axially-applied crash force. In the exemplary embodiment of FIG. 11, the crash trigger holes are rectangular. Rectangular holes can be formed, for example, by drilling, punching or another suitable known forming method. The other types of stabilizers mentioned above can include convolutions (see FIG. 12) and flanges (see FIGS. 13A and 13B) and can be spaced, for example, in the following manner. The distance from the front end of the strengthening member to the first hole can be about 35 mm to about 40 mm. The distance from the first hole to the second hole can be about 70 mm to about 90 mm, the distance from the second hole to the third hole can be about 75 mm, and subsequent holes can be spaced at, for example, between 70 mm and 110 mm. The presence of other stabilizers can affect the desired spacing and size of trigger holes.

Figure 14A:
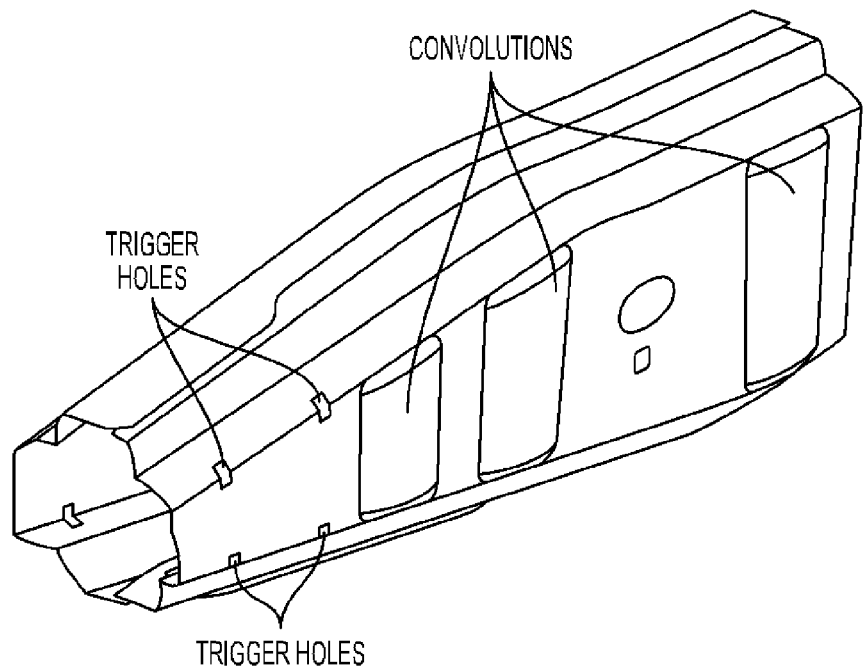
FIG. 14A is a perspective view of another exemplary embodiment of a strengthening member comprising trigger holes and convolutions.

In an embodiment of a strengthening member having convolutions such as that illustrated in FIG. 14A, a distance from a front end of the strengthening member to a first convolution can be about 100 mm to about 140 mm and the first convolution can have a width along a longitudinal axis of the strengthening member of from about 40 mm to about 80 mm. A distance between the first convolution and a second convolution can be from about 20 mm to about 30 mm and the second convolution can have a width along a longitudinal axis of the strengthening member of from about 40 mm to about 80 mm. A distance between the second convolution to a third convolution can be from about 100 mm to about 140 mm and the second convolution can have a width along a longitudinal axis of the strengthening member of from about 40 mm to about 80 mm. In an alternative embodiment of a strengthening member having convolutions, such as for example in the embodiment illustrated in FIG. 12, a distance from a front end of the strengthening member to a peak of a first convolution can be from about 60 mm to about 90 mm and a distance from the peak of the first convolution to a peak of a second convolution can be from about 100 mm to about 120 mm. A distance from the peak of the second convolution to a peak of a third convolution can be from about 100 mm to about 120 mm. More convolutions can be included with similar (or different) peak spacing. Convolution depths can vary, but for typical strengthening members, convolutions depths can be about 5 mm to about 20 mm. The convolutions in a strengthening member can all have the same depth or can have differing depths. The presence of other stabilizers can affect the desired spacing and size of convolutions.

Figure 13A:
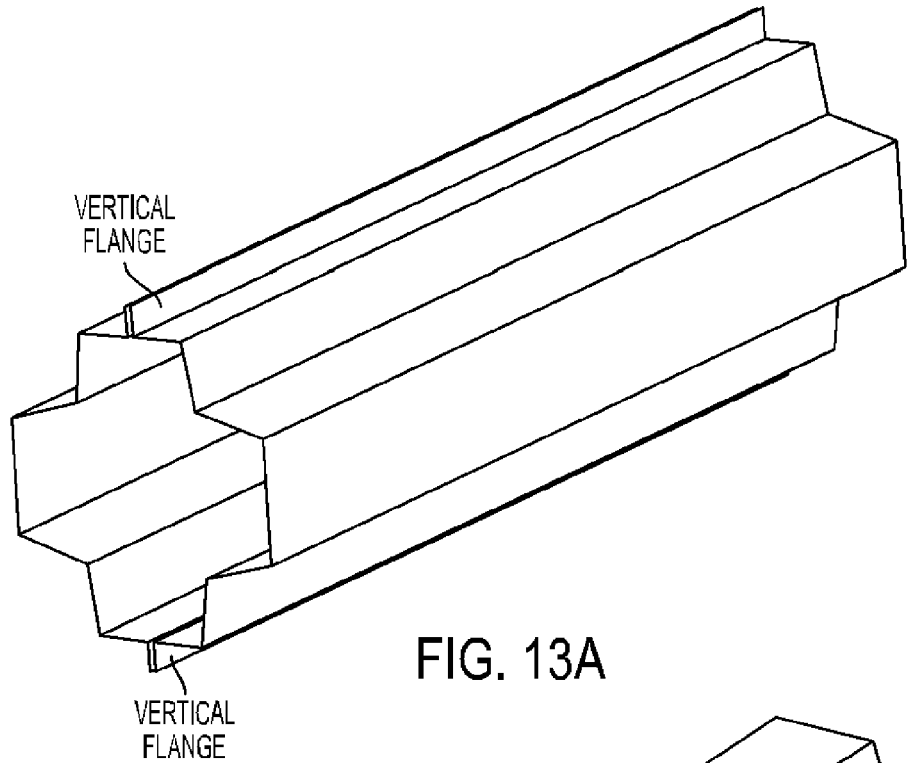
FIG. 13A is a perspective view of another exemplary embodiment of a strengthening member comprising vertical flanges.
Figure 13B:
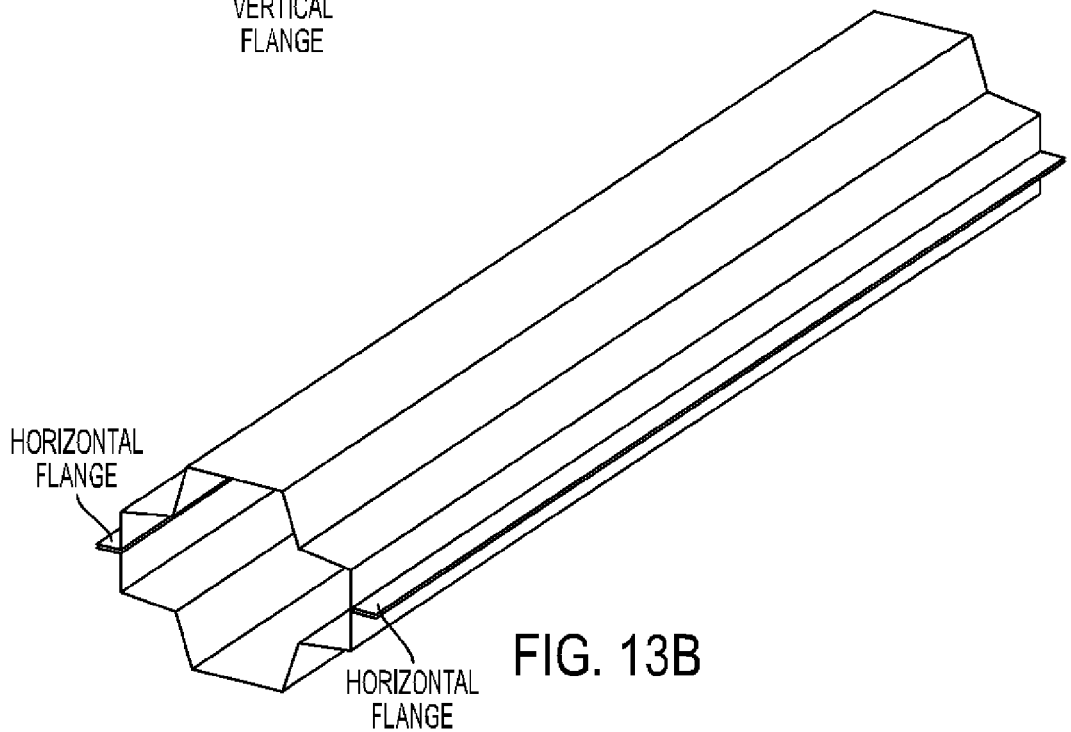
FIG. 13B is a perspective view of another exemplary embodiment of a strengthening member comprising horizontal flanges.

FIG. 13A illustrates an exemplary strengthening member comprising vertical flanges, and FIG. 13B illustrates an exemplary strengthening member comprising horizontal flanges. As one skilled in the art would appreciate, the flanges need not be either vertical or horizontal, and the flanges need not comprise two flanges extending in opposite directions as illustrated. Indeed, one, three, or more flanges can be utilized to stabilize a strengthening member in accordance with the present teachings. In certain embodiments of the present teachings, the strengthening member comprises two portions and the stabilizing flanges are located at the seams joining the two portions of the strengthening member. The flanges illustrated in FIGS. 13A and 13B are shown to run along an entire length of the strengthening member; however, one skilled in the art will appreciate that the flange can run along less than the entire length of the strengthening member. Placement of the flanges along the seams of the strengthening member has provided an unpredictably simple and cost effective way to provide a strengthening member having increased stability via controllable stiffness.

Contrary to trigger holes, flanges can stiffen a strengthening member by providing additional stiffness in a location where they are added. For example, if a strengthening member has tendency to bend sideways, the addition of horizontal flanges can increase horizontal stiffness to prevent the strengthening member from bending sideways. Similarly, vertical flanges can be employed on strengthening members that would otherwise bend vertically.

The length of the flanges can vary, for example depending on the buckling conditions of the strengthening member. Under certain conditions, a local flange having a limited length (e.g., 100 mm) can be sufficient to prevent local buckling and produce a desirable system performance. Under some conditions, a local flange can prevent buckling at a location where the flange is added, but the strengthening member can buckle at its next weakest location to bend. In such cases, multiple flanges or a continuous flange running along an entire length of the strengthening member can be employed to cause the strengthening member to fold progressively and crush axially.

Figure 14B:
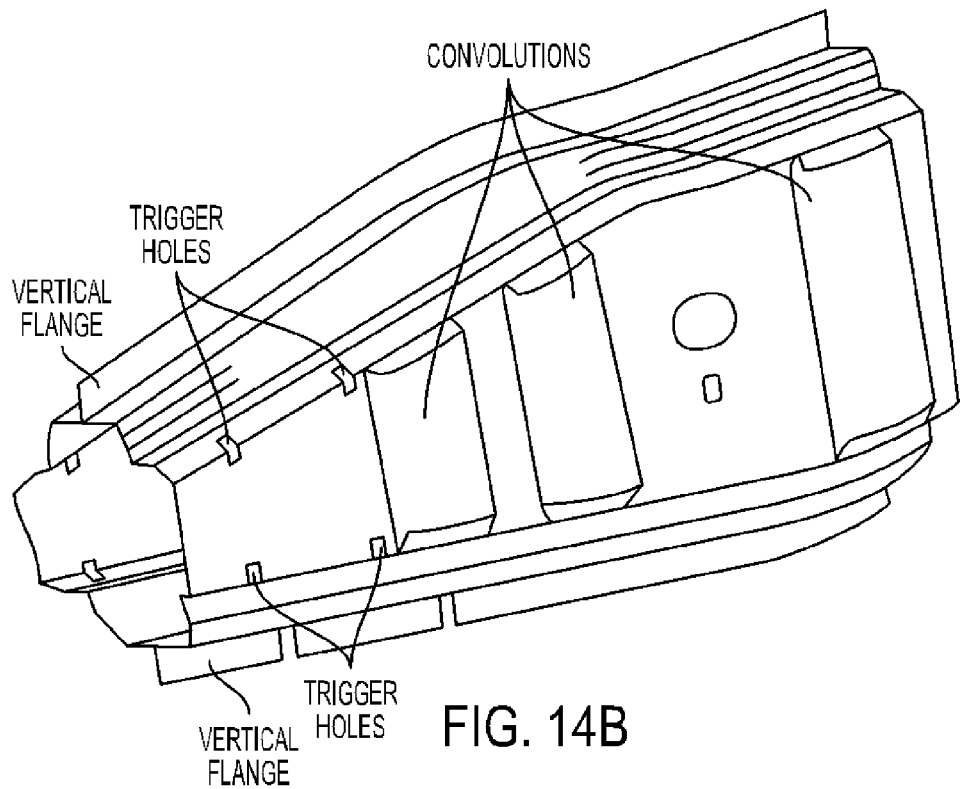
FIG. 14B is a perspective view of another exemplary embodiment of a strengthening member comprising trigger holes, convolutions, and vertical flanges.

More than one of the crash trigger holes and other stabilizers can be employed on a strengthening member to control the strengthening members folding mode. FIG. 14A illustrates an exemplary strengthening member comprising a combination of trigger holes and convolutions. FIG. 14B illustrates an exemplary strengthening member comprising a combination of trigger holes, convolutions, and vertical flanges.

Similar to trigger holes, convolutions can reduce the stiffness of a strengthening member at locations where the convolutions are created. Convolutions typically create kinks in the strengthening member that are weakened areas making it easier for the strengthening member to fold along the kinks.

Thus, convolutions can be added to a strengthening member and the number, size, and placement can be used to control the folding pattern of the strengthening member. It can be said convolutions work similar to an accordion, wherein the strengthening member folds sequentially along to the lines of the convolutions. The depth of the convolutions can range from about 2 mm to about 20 mm.

FIG. 15 provides an exemplary illustration of how various crash trigger holes and other stabilizers can be utilized to stabilize a crash mode of a twelve-cornered strengthening member. In row (a), representing a twelve-cornered strengthening member in accordance with the present teachings employing only trigger holes for crash mode control, the strengthening member undergoes a minimal amount of bending as it collapses in the axial direction. In row (b), representing a twelve-cornered strengthening member in accordance with the present teachings employing only convolutions for crash mode control, the strengthening member again undergoes a minimal amount of bending as it collapses in the axial direction. In row (c), representing a twelve-cornered strengthening member in accordance with the present teachings employing both trigger holes and convolutions for crash mode control, the strengthening member undergoes less bending as it collapses in the axial direction than if only one of trigger holes or convolutions are employed. Finally, in row (d), representing a twelve-cornered strengthening member in accordance with the present teachings employing trigger holes, convolutions, and flanges for crash mode control, the strengthening member undergoes significantly less bending as it collapses in the axial direction than if trigger holes, convolutions, and flanges are not employed.

While the present teachings have been disclosed in terms of exemplary embodiments in order to facilitate a better understanding, it should be appreciated that the present teachings can be embodied in various ways without departing from the scope thereof. Therefore, the present teachings should be understood to include all possible embodiments which can be embodied without departing from the scope of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A strengthening member for an automotive vehicle, the strengthening member comprising:
   a twelve-cornered cross section comprising sides and corners creating internal angles and external angles,
   wherein, along a perimeter of the twelve-cornered cross section, the external angles are separated from each other by not more than two internal angles,
   wherein each of the internal angles and the external angles are greater than 90 degrees and less than 180 degrees, and
   the strengthening member also comprising trigger holes to stabilize the folding mode and prevent bending in response to an axially-applied crash force.

2. The strengthening member of claim 1, wherein the trigger holes are circular.

3. The strengthening member of claim 1, wherein the trigger holes are rectangular.

4. The strengthening member of claim 1, wherein the trigger holes are located at every other internal angle of the twelve-cornered strengthening member.

5. The strengthening member of claim 4, comprising three rings of trigger holes.

6. The strengthening member of claim 1, further comprising convolutions to stabilize the folding mode and prevent bending in response to an axially-applied crash force.

7. The strengthening member of claim 1, further comprising flanges to stabilize the folding mode and prevent bending in response to an axially-applied crash force.

8. A strengthening member for an automotive vehicle, the strengthening member comprising:
   a twelve-cornered cross section comprising sides and corners creating internal angles and external angles,
   wherein each of the internal angles and the external angles is greater than 90 degrees and less than 180 degrees,
   the strengthening member also comprising at least one flange to stabilize the folding mode and prevent bending in response to an axially-applied crash force.

9. The strengthening member of claim 8, wherein the flange extends radially outwardly from the strengthening member in a vertical direction.

10. The strengthening member of claim 8, wherein the flange extends radially outwardly from the strengthening member in a horizontal direction.

11. The strengthening member of claim 8, wherein the strengthening member comprises two portions and the flange is located at at least one seam joining the two portions of the strengthening member.

12. The strengthening member of claim 8, wherein the flange extends along the entire length of the strengthening member.

13. The strengthening member of claim 8, further comprising convolutions to stabilize the folding mode and prevent bending in response to an axially-applied crash force.

14. The strengthening member of claim 13, further comprising trigger holes to stabilize the folding mode and prevent bending in response to an axially-applied crash force.

15. An automotive vehicle front rail having a twelve-cornered cross section comprising:
   twelve sides and twelve corners, wherein the sides and corners create internal angles and external angles, wherein each of the internal angles is greater than 90 degrees and less than 180 degrees, the front rail also comprising structural members including at least one of trigger holes and convolutions to stabilize the folding mode and prevent bending in response to an axially-applied crash force, wherein a cross section of the front rail has substantially the same symmetry along a first axis as along a second axis, wherein the first axis and the second axis are orthogonal to one another.

16. The automotive vehicle front rail of claim 15, comprising three rings of trigger holes.

17. The automotive vehicle front rail of claim 15, wherein the trigger holes are formed in at least one convex corner of the twelve-cornered strengthening member.

18. The automotive vehicle front rail of claim 17, wherein the trigger holes are formed in every other convex corner of the twelve-cornered strengthening member.

19. The automotive vehicle front rail of claim 15, further comprising convolutions on at least one of the sides of the front rail.

20. The automotive vehicle front rail of claim 19, further comprising convolutions on opposing sides of the front rail.

* * * * *